(12) United States Patent
Wiedermann et al.

(10) Patent No.: US 7,488,154 B2
(45) Date of Patent: Feb. 10, 2009

(54) INTAKE HOUSING FOR AXIAL FLUID FLOW ENGINES

(75) Inventors: Alexander Wiedermann, Hünxe (DE); Martin Böhle, Wuppertal (DE)

(73) Assignee: Man Turbo AG, Oberhausen (DE)

( * ) Notice: Subject to any disclaimer, the term of this patent is extended or adjusted under 35 U.S.C. 154(b) by 563 days.

(21) Appl. No.: 11/189,194

(22) Filed: Jul. 26, 2005

(65) Prior Publication Data
US 2006/0024152 A1   Feb. 2, 2006

(30) Foreign Application Priority Data
Jul. 27, 2004   (DE) .................. 10 2004 036 331

(51) Int. Cl.
*F01D 9/00*   (2006.01)
(52) U.S. Cl. ...................... 415/205; 415/222
(58) Field of Classification Search .......... 415/223, 415/225, 226, 212.1, 205, 184, 191, 208.1, 415/208.2, 220, 222, 203
See application file for complete search history.

(56) References Cited
U.S. PATENT DOCUMENTS
4,274,804 A   6/1981   Teshima et al.
5,257,906 A   11/1993   Gray et al.

FOREIGN PATENT DOCUMENTS
| | | |
|---|---|---|
| AT | 365 742 | 2/1982 |
| DE | 44 26 522 | 2/1996 |
| EP | 0 041 712 B1 | 12/1981 |
| EP | 0 385 294 | 9/1990 |
| EP | 0 959 231 | 11/1999 |
| GB | 805003 | 11/1958 |
| GB | 2 001 707 A | 2/1979 |
| SU | 1 430 609 | 10/1988 |

*Primary Examiner*—Edward Look
*Assistant Examiner*—Anthony C Brock
(74) *Attorney, Agent, or Firm*—McGlew and Tuttle, P.C.

(57) ABSTRACT

An intake housing for axial fluid flow engines, especially for axial-flow compressors, is proposed. The intake housing comprises an intake shaft (1) with a radial inlet (4) on one side and with an axial, rotationally symmetrical inlet cone (5), which forms an axial flow part (2) together with a jacket (6) protruding into the intake shaft (1) with an inlet edge (7). The axial flow part (2) is in connection with the inlet cross section of the fluid flow engine. The inlet edge (7) of the jacket (6) is connected with an annular diaphragm (9), which is directed at right angles to the axis (10) of the axial flow part (2). Furthermore, the diaphragm (9) is arranged mirror symmetrically at right angles to the axis (10) of the axial flow part (2) and asymmetrically in relation to the axis (10) of the axial flow part (2). An overhang, which is greater on the side of the diaphragm (9) facing the radial inlet (4) than on the side facing away from the radial inlet (4), is present between the outer edge of the diaphragm (9) and the inlet edge (7) of the jacket (6).

12 Claims, 2 Drawing Sheets

INTAKE HOUSING FOR AXIAL FLUID FLOW ENGINES

CROSS REFERENCE TO RELATED APPLICATIONS

This application claims the benefit of priority under 35 U.S.C. § 119 of German Application DE 10 2004 036 331.5 filed Jul. 27, 2004, the entire contents of which are incorporated herein by reference.

FIELD OF THE INVENTION

The present invention pertains to an intake housing for axial fluid flow engines, especially for axial-flow compressors with an intake shaft with an inlet on one side and with an axial, rotationally symmetrical inlet cone, the intake housing being in connection with the inlet cross section of the fluid flow engine.

BACKGROUND OF THE INVENTION

Intake housings of industrial gas turbines are designed differently from the intakes of aircraft engines, to which flow is admitted uniformly axially more or less freely from all sides. By contrast, industrial gas turbines are located in buildings or sound protection devices, attached to frames. The air is drawn in via an intake shaft in the roof area, and it is then delivered through a mostly vertical connection duct to the level of the gas turbine. Finally, the air drawn in must again be deflected into the axial direction in order to enable the air to flow into the compressor possibly in the circumferential direction in the same direction in order not to jeopardize the stability of the compressor. Such intakes are usually designed on the basis of published correlations, which are, however, concentrated on the axial-feed to the compressor only. To make the deflected flow as uniform as possible in the circumferential direction, the intake section is made especially long, or the vertical part of the intake shaft is made very broad and deep. As a result, the length of the entire gas turbine as well as the surfaces wetted by the air become very large.

SUMMARY OF THE INVENTION

The basic object of the present invention is to design the intake housing of axial fluid flow engines such that the overall axial length of the fluid flow engine is shortened.

According to the invention, an intake housing is provided for axial fluid flow engines, especially for axial-flow compressors. The intake housing comprises an intake shaft with an inlet on one side and with an axial, rotationally symmetrical inlet cone, which forms an axial flow part together with a jacket protruding into the intake shaft with an inlet edge. The intake housing is in connection with the inlet cross section of the fluid flow engine. The inlet edge of the jacket is connected with a annular diaphragm, which is directed at right angles to the axis of the axial flow part. The diaphragm is mirror symmetrical at right angles to the axis of the axial flow part. The diaphragm is asymmetrical in relation to the axis of the axial flow part. An overhang, which is greater on the side of the diaphragm facing the radial inlet than on the side facing away from the inlet, is present between the outer edge of the diaphragm and the inlet edge of the jacket.

The diaphragm may be limited on the outside by a circle having a center is displaced in the direction of the radial inlet in relation to the axis of the axial flow part. The diaphragm may also be limited on the outside by a geometric figure that is closed in itself and has only one axis of symmetry, and that the axis of symmetry extends at right angles to the axis of the axial flow part. As one example, the geometric figure is an ellipse, namely the diaphragm is limited on the outside by an ellipse.

The gaseous medium flowing in radially is split by a plate, which forms the diaphragm and is not rotationally symmetrical, such that the medium flows into the axial flow part leading to the fluid flow engine in such a way that it is distributed uniformly over the circumference. The intake section can thus be shortened and the volume of the vertical part of the intake shaft can be reduced compared to the prior-art intake housings. The effect of this is that the overall axial length of the fluid flow engine can be substantially shortened.

An exemplary embodiment of the present invention is shown in the drawings and will be explained in greater detail below. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
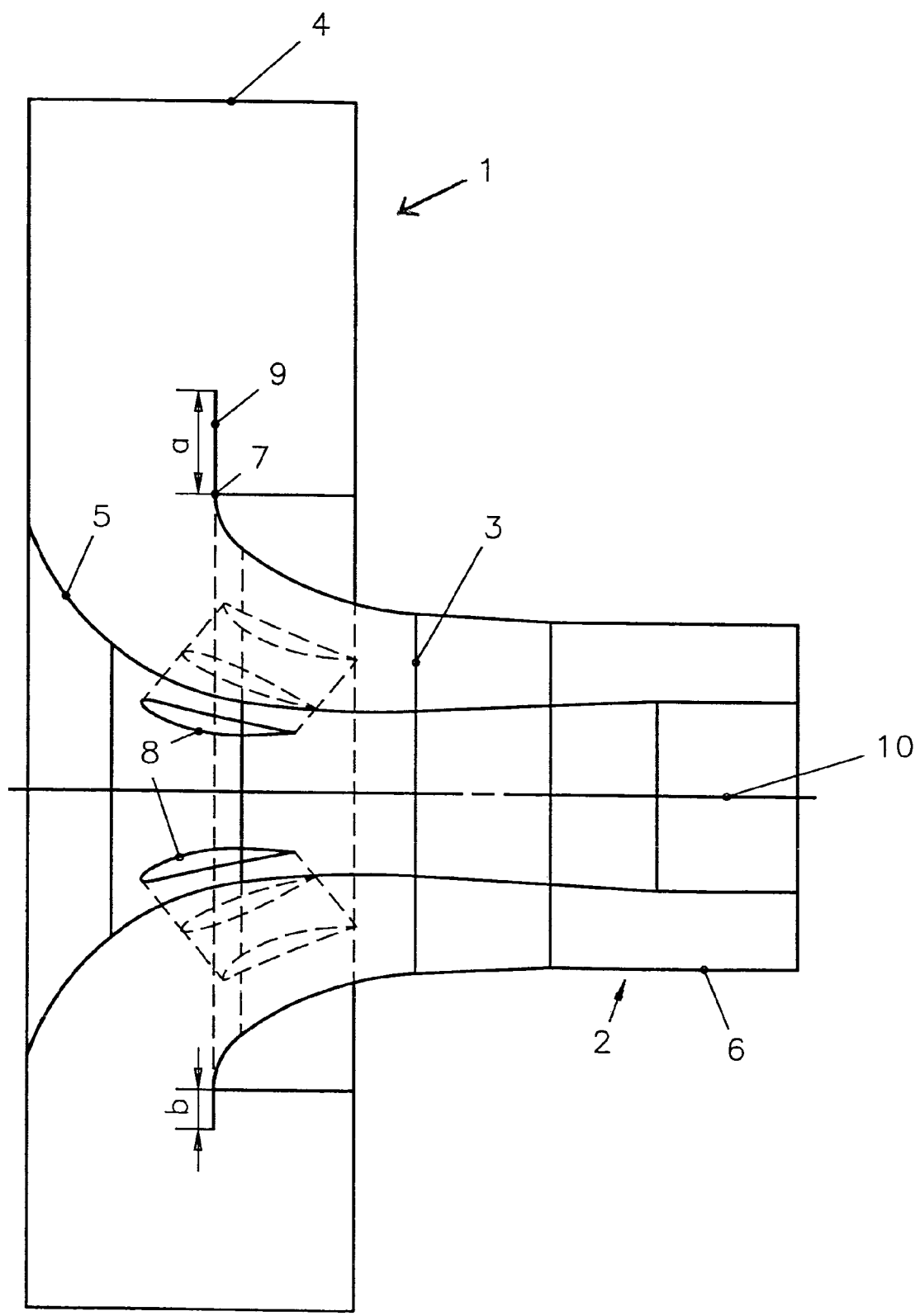
FIG. 1 is a longitudinal sectional view through an intake shaft of an intake housing of an axial fluid flow engine.
Figure 2:
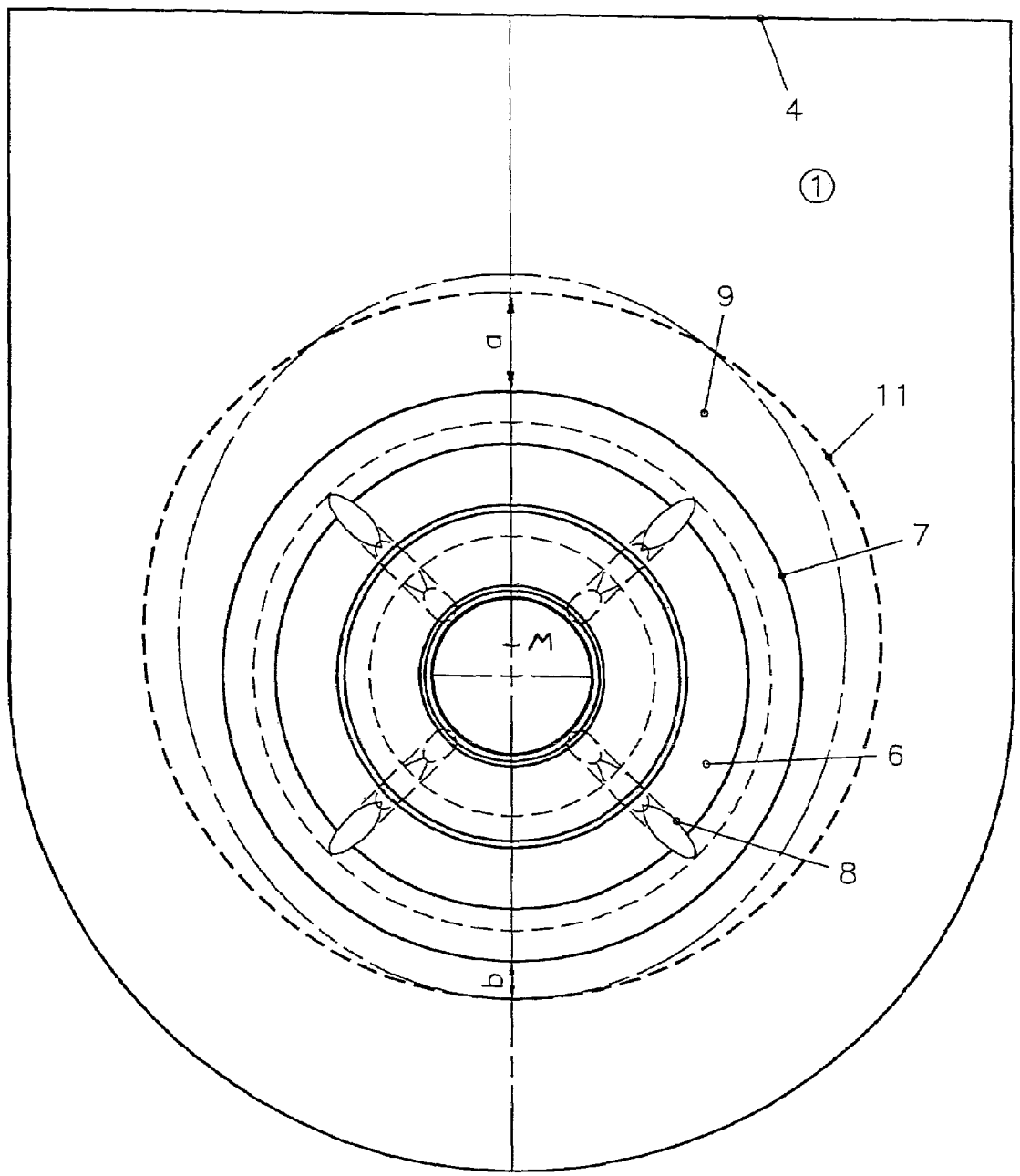
FIG. 2 is a side view of the structure of FIG. 1.

Referring to the drawings in particular, gas or air is fed to an axial fluid flow engine, which may be an axial process compressor or the axial air compressor of an industrial gas turbine, through the intake shaft 1 of an intake housing and an axial flow part 2. The axial flow part 2 has an annular, rotationally symmetrical cross section and is in connection with the inlet cross section of the axial fluid flow engine, not shown. The inlet edge of the preliminary stator of the fluid flow engine is located within the flow part 2 in the plane 3.

The intake shaft 1 is open on one side and has a radial intake 4. A tapering inlet cone 5, which forms the axial flow part 2 together with a jacket 6, is fastened to the rear wall of the intake shaft 1 in the extension of the axis 10 of the axial flow part 2. The flow part 2 protrudes with its inlet edge 7 into the intake shaft 1, as a result of which a rotationally symmetrical intake orifice is formed. Flow guide surfaces 8 are arranged on the inlet cone 5 within the intake orifice.

An annular diaphragm 9 in the form a non-rotationally symmetrical plate is attached to the inlet edge 7 of the jacket 6. The diaphragm 9 is directed at right angles to the horizontal axis of the axial flow part 2. The diaphragm 9 is mirror symmetrical at right angles to the horizontal axis 10 of the axial flow part 2. The diaphragm 9 is asymmetrical in the direction of the axis 10 of the axial flow part 2.

The diaphragm 9 is preferably limited by a circle 11, whose center M is displaced in the direction of the radial intake 4 of the intake shaft 1 relative to the axis 10 of the axial flow part 2. As a result, an overhang is formed between the inlet edge 7 of the jacket 6 and the outer edge of the diaphragm 9. This overhang is greatest with the value a on the side of the diaphragm 9 facing the radial intake 4 and lowest with the value b on the side facing away from the intake 4.

Instead of a circle 11, the diaphragm 9 may also be replaced by another figure, which is closed in itself, with only one axis of symmetry. This geometric figure may have the shape of an ellipse 12 or of an oval. The only axis of symmetry of the geometric figure is directed at right angles to the axis 10 of the axial flow part 2. An overhang, which is greater in the side of the diaphragm 9 facing the radial inlet 4 than on the side facing away from the inlet 4, is present in this case as well.

While specific embodiments of the invention have been shown and described in detail to illustrate the application of the principles of the invention, it will be understood that the invention may be embodied otherwise without departing from such principles.

What is claimed is:

1. An intake housing for axial fluid flow engines, the intake housing comprising:
    an intake shaft with an inlet on one side forming a radial inlet;
    an axial, rotationally symmetrical inlet cone protruding into said intake shaft;
    a jacket protruding into said intake shaft, said jacket having an inlet edge, said inlet edge of said jacket forming a rotationally symmetrical intake orifice about said inlet cone, said inlet cone and said jacket forming an axial flow part protruding into said intake shaft, the intake housing being in connection with an inlet cross section of the fluid flow engine, said inlet edge of said jacket being connected with an annular diaphragm in a form of a plate such that said plate forms an overhang between an outer edge of said diaphragm and said inlet edge of said jacket, said annular diaphragm being directed at right angles to an axis of said axial flow part, said diaphragm being mirror symmetrical at right angles to said axis of said axial flow part and being asymmetrical in relation to said axis of said axial flow part, wherein said overhang is greater on the side of said diaphragm facing said radial inlet than on the side facing away from said radial inlet.

2. An intake housing in accordance with claim 1, wherein said diaphragm is limited on an outside by a circle, the circle having a center displaced in the direction of said radial inlet in relation to said axis of said axial flow part.

3. An intake housing in accordance with claim 1, wherein said diaphragm is limited on an outside by a geometric figure that is closed in itself and has only one axis of symmetry, and said axis of symmetry extends at right angles to said axis of said axial flow part.

4. An intake housing in accordance with claim 3, wherein said diaphragm is limited on the outside by an ellipse.

5. An axial flow compressor intake housing, comprising:
    an intake shaft with a shaft inlet that is radially outwardly of a central axis;
    an axially extending rotationally symmetrical inlet cone protruding into said intake shaft;
    a jacket protruding into said intake shaft, said jacket having an inlet edge, said inlet cone and said jacket forming an axial flow part protruding into said intake shaft, the intake housing being in connection with an axial flow compressor inlet, said inlet edge of said jacket being connected with an annular diaphragm, said annular diaphragm defining an overhang between an outer edge thereof and said inlet edge of said jacket, said inlet edge of said jacket defining an intake orifice about said inlet cone, said intake orifice being rotationally symmetrical, said annular diaphragm being directed at right angles to said central axis, said annular diaphragm being substantially symmetrical along a radial axis extending toward said inlet from said central axis and being asymmetrical in relation to said central axis, wherein said overhang is greater on the side of said diaphragm facing said radial inlet than on the side facing away from said radial inlet.

6. An intake housing in accordance with claim 5, wherein said diaphragm is limited on an outside by a circle, said circle having a center displaced in the direction of said radial inlet in relation to said central axis.

7. An intake housing in accordance with claim 5, wherein said diaphragm is limited on an outside by a geometric figure that is closed in itself and has only one axis of symmetry, and said axis of symmetry extends at right angles to said central axis.

8. An intake housing in accordance with claim 7, wherein said diaphragm is limited on the outside by an ellipse.

9. An intake housing for axial fluid flow engines, the intake housing comprising:
    an intake shaft with an inlet on one side forming a radial inlet;
    an axial, rotationally symmetrical inlet cone extending into said intake shaft said inlet cone having an inlet cone outer surface;
    a plate defining an annular diaphragm;
    a jacket extending into said intake shaft, said jacket having an inlet edge, said inlet cone and said jacket forming an axial flow part extending into said intake shaft, said inlet edge of said jacket and at least a portion of said inlet cone outer surface defining a rotationally symmetrical intake orifice, the intake housing being in connection with an inlet cross section of the fluid flow engine, said inlet edge of said jacket being connected with said plate such that said plate defines an overhang radially extending between an outer edge of said diaphragm and said inlet edge of said jacket, said annular diaphragm being directed at right angles to an axis of said axial flow part, said diaphragm being mirror symmetrical at right angles to said axis of said axial flow part and being asymmetrical in relation to said axis of said axial flow part, wherein a dimension of said overhang is greater on the side of said diaphragm facing said radial inlet than a dimension of said overhang on the side facing away from said radial inlet.

10. An intake housing in accordance with claim 9, wherein said diaphragm is limited on an outside by a circle, the circle having a center displaced in the direction of said radial inlet in relation to said axis of said axial flow part.

11. An intake housing in accordance with claim 9, wherein said diaphragm is limited on an outside by a geometric figure that is closed in itself and has only one axis of symmetry, and said axis of symmetry extends at right angles to said axis of said axial flow part.

12. An intake housing in accordance with claim 11, wherein said diaphragm is limited on the outside by an ellipse.

* * * * *